United States Patent
Yuasa et al.

(10) Patent No.: US 9,712,071 B2
(45) Date of Patent: Jul. 18, 2017

(54) POWER CONVERSION DEVICE AND AIR-CONDITIONING APPARATUS

(71) Applicant: Mitsubishi Electric Corporation, Tokyo (JP)

(72) Inventors: Kenta Yuasa, Tokyo (JP); Shinsaku Kusube, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/908,177

(22) PCT Filed: Sep. 26, 2013

(86) PCT No.: PCT/JP2013/076146
§ 371 (c)(1),
(2) Date: Jan. 28, 2016

(87) PCT Pub. No.: WO2015/045076
PCT Pub. Date: Apr. 2, 2015

(65) Prior Publication Data
US 2016/0172993 A1 Jun. 16, 2016

(51) Int. Cl.
*H02M 7/48* (2007.01)
*H02M 5/458* (2006.01)
(Continued)

(52) U.S. Cl.
CPC .............. *H02M 5/458* (2013.01); *H02M 7/04* (2013.01); *H02P 27/04* (2013.01); *H02P 27/06* (2013.01);
(Continued)

(58) Field of Classification Search
CPC ....................................................... H02M 7/48
(Continued)

(56) References Cited

U.S. PATENT DOCUMENTS

| 7,528,590 B2 * | 5/2009 | Wei ........................ | H02M 3/156 323/282 |
| 7,768,242 B2 * | 8/2010 | Wei ........................ | H02M 3/156 323/222 |
| 2012/0194258 A1 | 8/2012 | Nien et al. | |

FOREIGN PATENT DOCUMENTS

| JP | H01-218350 A | 8/1989 |
| JP | 09-070178 A | 3/1997 |

(Continued)

OTHER PUBLICATIONS

International Search Report of the International Searching Authority mailed Nov. 5, 2013 for the corresponding international application No. PCT/JP2013/076146 (and English translation).

(Continued)

*Primary Examiner* — Bentsu Ro
(74) *Attorney, Agent, or Firm* — Posz Law Group, PLC (57) ABSTRACT

A power conversion device includes: a rectifier, a converter unit including a reactor, a backflow prevention element, and a switching element, the converter unit being configured to boost a DC voltage rectified by the rectifier, a smoothing capacitor, a reactor current detection unit, a bus voltage detection unit, a temperature detection unit, and a control unit. The control unit includes a converter control unit configured to calculate a switching command value for driving the switching element, on the basis of a target command voltage which is the bus voltage to be targeted, the bus voltage detected by the bus voltage detection unit, and the reactor current detected by the reactor current detection unit, and a temperature correction unit configured to correct the temperature of the switching element detected by the temperature detection unit, on the basis of the switching command value calculated by the converter control unit.

13 Claims, 4 Drawing Sheets

(51) Int. Cl.
*H02M 7/04* (2006.01)
*H02P 27/04* (2016.01)
*H02P 27/06* (2006.01)
*H02P 29/68* (2016.01)
*H02M 3/156* (2006.01)
*H02M 1/00* (2006.01)
*H02M 1/32* (2007.01)

(52) U.S. Cl.
CPC .............. *H02P 29/68* (2016.02); *H02M 3/156* (2013.01); *H02M 2001/007* (2013.01); *H02M 2001/327* (2013.01); *H02P 2201/09* (2013.01)

(58) Field of Classification Search
USPC .................. 318/430–434, 471–477, 504
See application file for complete search history.

(56) References Cited

FOREIGN PATENT DOCUMENTS

| | | |
|---|---|---|
| JP | 2004-180466 A | 6/2004 |
| JP | 2005-184977 A | 7/2005 |
| JP | 2006-230078 A | 8/2006 |
| JP | 2007-049810 A | 2/2007 |
| JP | 2009-130967 A | 6/2009 |
| JP | 4678374 B2 | 4/2011 |
| JP | 2011-217463 A | 10/2011 |
| JP | 2011-258623 A | 12/2011 |
| JP | 2013-048513 A | 3/2013 |
| WO | 2006/101188 A1 | 9/2006 |

\* cited by examiner

POWER CONVERSION DEVICE AND AIR-CONDITIONING APPARATUS

CROSS REFERENCE TO RELATED APPLICATION

This application is a U.S. national stage application of International Application No. PCT/JP2013/076146 filed on Sep. 26, 2013, the disclosure of which is incorporated herein by reference.

TECHNICAL FIELD

The present invention relates to a power conversion device having a boosting function and an air-conditioning apparatus using the power conversion device.

BACKGROUND ART

In an air-conditioning apparatus, a method of driving a motor used for a compressor, a fan, and the like with an inverter for the purpose of energy saving has become mainstream. According to this method, first, an alternating current is converted by a converter to a direct current, and the direct current is converted by the inverter to an alternating current having an optional voltage and frequency. By using the alternating current having the optional voltage and frequency, the motor is driven, whereby it is possible to operate the motor with high efficiency. In recent years, an air-conditioning apparatus has been proposed in which, in pursuit of further energy saving, a boosting circuit is provided at the input side of an inverter, a rectification output rectified by a converter is boosted by using the boosting circuit, and the boosted rectification output is inputted to the inverter.

In general, in a converter, a temperature detection unit such as a thermistor is provided near a semiconductor element used as a switching element, and a result of detection at the temperature detection unit is monitored to suppress abnormal superheating of the semiconductor element. Furthermore, a technique has also been proposed in which, in addition to the result of detection at the temperature detection unit, information such as an operation pattern is monitored to suppress abnormal superheating of the semiconductor element.

Patent Literature 1 discloses an inverter device which includes: a voltage detection circuit which detects an input voltage of a converter circuit; and a temperature detector which detects a temperature near the converter circuit. Patent Literature 1 is intended to control an inverter circuit on the basis of the relationship between the input voltage detected by the voltage detection circuit and the temperature detected by the temperature detector, to suppress an increase in the temperature of a switching element of the converter circuit.

Patent Literature 2 discloses a controller including a temperature estimation unit which estimates the temperature of an inverter on the basis of information regarding an operating state of the inverter. Patent Literature 2 is intended to provide an upper limit for the operating voltage of the inverter on the basis of the temperature of the inverter estimated by the temperature estimation unit, to prevent a voltage exceeding the withstand voltage of the switching element of the inverter from being applied to the inverter.

CITATION LIST

Patent Literature

Patent Literature 1: Japanese Unexamined Patent Application Publication No. 2004-180466 (claim 1, page 5)
Patent Literature 2: Japanese Patent No. 4678374 (pages 11 to 14)

SUMMARY OF INVENTION

Technical Problem

However, in the inverter device disclosed in Patent Literature 1 requires a voltage detection circuit which detects an input voltage, and thus the cost is increased for the circuit. In addition, it is necessary to ensure a place for mounting the voltage detection circuit, leading to a further increase in the cost. Furthermore, heat generation of the converter depends on not only the input voltage but also a boosting amount at the converter unit. Thus, with control of the inverter circuit based on the input voltage, it is insufficient to suppress an increase in the temperature of the switching element of the converter unit. The controller disclosed in Patent Literature 2 estimates the temperature of the inverter unit on the basis of the operating state of the inverter unit, but does not take the converter unit into account.

The converter unit needs to be switched at a higher speed than the inverter unit, and thus an amount of heat generated by the converter unit is larger than that by the inverter unit. Therefore, it is necessary to appropriately recognize the temperature of the converter unit. In order to accurately detect the temperature of the converter unit, the temperature detection unit suffices to be provided as close to the converter unit as possible. However, when the temperature detection unit is provided in a module in which a rectifier, a converter unit, and an inverter unit are housed in a single package, the packaging density within the module becomes high, so that it is difficult to provide the temperature detection unit closely to the converter unit in some cases. In addition, if the temperature detection unit can be provided closely to the converter unit, since a switching element of the converter unit is switched at a high speed, the temperature detection unit to be likely to be subject to noise or the like due to the switching. As a result, there is a possibility of erroneous detection by the temperature detection unit.

The present invention has been made in view of the above-described problems, and an object of the present invention is to provide a power conversion device which appropriately recognizes the temperature of a switching element of a converter unit even when a temperature detection unit is provided at a position away from the switching element of the converter unit, thereby improving reliability; and an air-conditioning apparatus using the power conversion device.

Solution to Problem

A power conversion device according to the present invention includes: a rectifier configured to rectify an input voltage supplied from an AC power supply; a converter unit including: a reactor connected to an output end of the rectifier; a backflow prevention element connected in series to the reactor; and a switching element connected between the reactor and the backflow prevention element, the converter unit being configured to boost a DC voltage rectified by the rectifier; a smoothing capacitor configured to smooth a bus voltage outputted from the converter unit; a reactor current detection unit configured to detect a reactor current flowing through the reactor; a bus voltage detection unit configured to detect the bus voltage; a temperature detection unit configured to detect a temperature of the switching element; and a control unit. The control unit includes: a converter control unit configured to calculate a switching command value for driving the switching element, on the basis of a target command voltage which is the bus voltage to be targeted, the bus voltage detected by the bus voltage detection unit, and the reactor current detected by the reactor current detection unit; and a temperature correction unit configured to correct the temperature of the switching element detected by the temperature detection unit, on the basis of the switching command value calculated by the converter control unit.

Advantageous Effects of Invention

According to the present invention, the temperature correction unit corrects the temperature of the switching element of the converter unit which temperature is detected by the temperature detection unit, on the basis of the switching command value calculated by the converter control unit. Thus, even if the temperature detection unit is installed at a position away from the switching element, it is possible to accurately recognize the temperature of the switching element. In addition, a voltage detection unit is unnecessary, and thus it is possible to suppress cost increase.

DESCRIPTION OF EMBODIMENTS

Hereinafter, Embodiments of a power conversion device and an air-conditioning apparatus using the power conversion device according to the present invention will be described with reference to the drawings. The present invention is not limited to Embodiments described below. In addition, the relationship of the size of each constituent element in the drawings described below including FIG. 1 may be different from the actual relationship.

Embodiment 1

Figure 1:
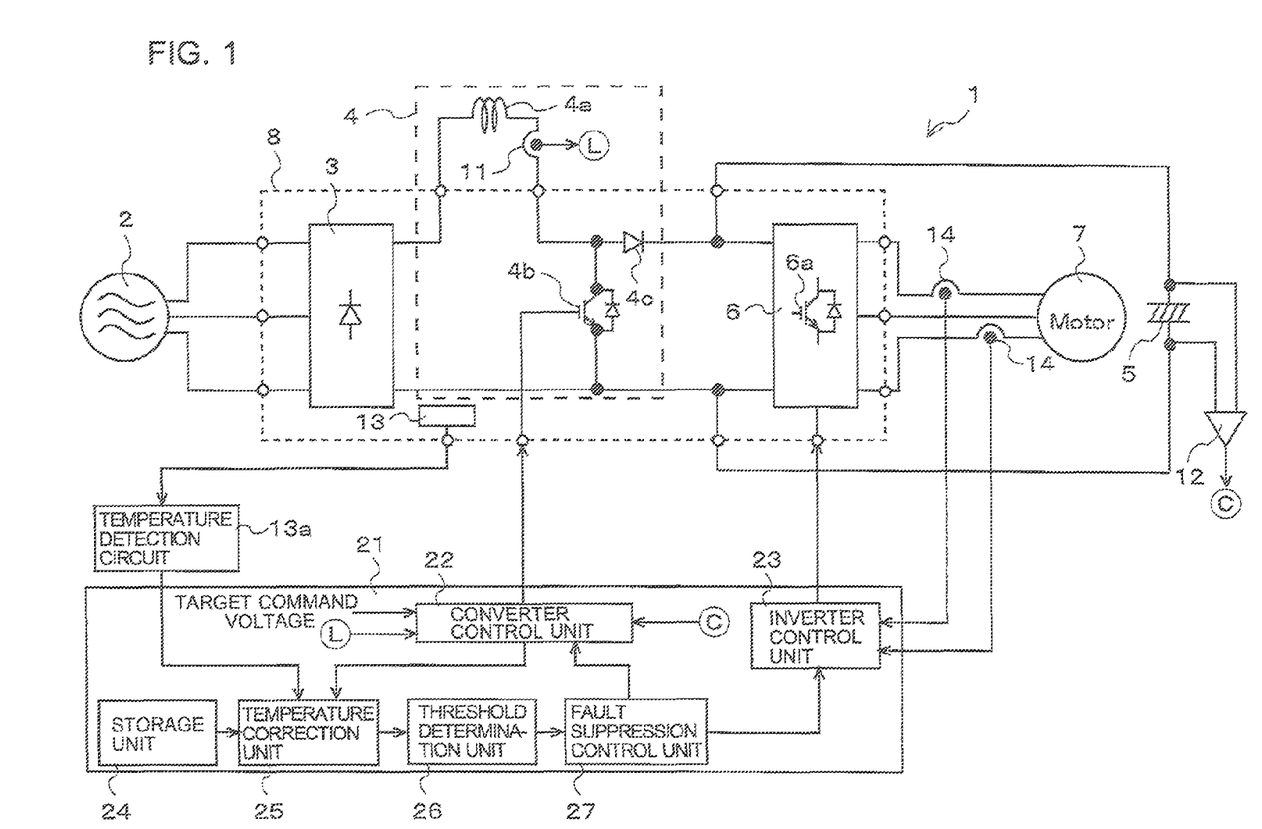
FIG. 1 is a circuit diagram showing a power conversion device 1 according to Embodiment 1.

FIG. 1 is a circuit diagram showing a power conversion device 1 according to Embodiment 1. The power conversion device 1 will be described based on FIG. 1. As shown in FIG. 1, the power conversion device 1 includes a rectifier 3, a converter unit 4, a smoothing capacitor 5, an inverter unit 6, a reactor current detection unit 11, a bus voltage detection unit 12, a temperature detection unit 13, and a control unit 21.

(Rectifier 3)

The rectifier 3 converts an AC voltage which is an input voltage supplied from an AC power supply 2, for example, a three-phase AC power supply, to a DC voltage. The rectifier 3 is a three-phase full wave rectifier in which, for example, six diodes are bridge-connected, and the AC voltage supplied from the AC power supply 2 may be, for example, AC 200 V.

(Converter unit 4)

The converter unit 4 chops and varies the DC voltage rectified by the rectifier 3, and is, for example, a booster converter circuit (booster chopper circuit) which boosts the DC voltage. The converter unit 4 is able to boost the DC voltage rectified by the rectifier 3, to an optional voltage such as DC 365 V. In addition, the converter unit 4 includes a booster reactor 4a, a switching element 4b, and a backflow prevention element 4c. Among them, the backflow prevention element 4c may be, for example, a backflow prevention diode. The reactor 4a is connected to an output end of the rectifier 3, and the backflow prevention element 4c is connected in series to the reactor 4a. The switching element 4b is connected between the reactor 4a and the backflow prevention element 4c.

A driving signal having a preset duty ratio is inputted to the switching element 4b, and switching operation thereof is controlled by a converter control unit 22 of the control unit 21. For example, a semiconductor element such as a MOSFET or an IGBT may be used as the switching element 4b, but the switching element 4b may be composed of a wide band gap semiconductor such as a diamond element, a gallium nitride (GaN) element, or a silicon carbide (SiC) element having a wider band gap than that of a silicon (Si) element.

When the switching element 4b is ON, the DC voltage rectified by the rectifier 3 is applied to the reactor 4a, so that conduction to the backflow prevention element 4c is blocked. On the other hand, when the switching element 4b is OFF, the backflow prevention element 4c is conducted, and a voltage in the direction opposite to that of a voltage applied when the switching element 4b is ON is induced in the reactor 4a. The energy stored in the reactor 4a when the switching element 4b is ON is transferred to the smoothing capacitor 5 when the switching element 4b is turned OFF. At that time, it is possible to control a bus voltage outputted from the converter unit 4, by controlling an ON duty (a ratio between ON and OFF) of the switching element 4b.

(Smoothing Capacitor 5)

The smoothing capacitor 5 smoothes the bus voltage outputted from the converter unit 4, that is, a bus voltage boosted by the converter unit 4.

(Inverter Unit 6)

The inverter unit 6 converts the bus voltage which is smoothed by the smoothing capacitor 5 and charged in the smoothing capacitor 5, to an AC voltage, and is composed of, for example, a plurality of inverter switching elements 6a. The inverter unit 6 is connected to a load such as a motor 7 used for a compressor of an air-conditioning apparatus, and supplies an AC current having predetermined frequency to the load. Operation of the inverter unit 6 is controlled by an inverter control unit 23 of the control unit 21. One motor current detection unit 14 for detecting a rotation speed is provided at each of the input side and the output side of the motor 7 which is the load.

(Module 8)

Among the components described above, the rectifier 3, the switching element 4b and the backflow prevention element 4c of the converter unit 4, and the inverter unit 6 are integrated in a single module 8.

(Reactor Current Detection Unit 11)

The reactor current detection unit 11 is, for example, connected in series to the reactor 4a and detects a reactor current flowing through the reactor 4a.

(Bus Voltage Detection Unit 12)

The bus voltage detection unit 12 is, for example, connected in parallel to the smoothing capacitor 5 and detects a bus voltage in the smoothing capacitor 5.

(Temperature Detection Unit 13)

The temperature detection unit 13 may be installed, for example, at any position in the module 8, and detects the temperature in the module 8, particularly, the temperature of the switching element 4b. A signal outputted from the temperature detection unit 13 is received by a temperature detection circuit 13a which transmits a signal regarding the temperature of the switching element 4b to the converter control unit 22 of the control unit 21.

(Control Unit 21)

The control unit 21 is composed of, for example, a microcomputer, and includes the converter control unit 22, the temperature correction unit 25, a storage unit 24, a threshold determination unit 26, a fault suppression control unit 27, and the inverter control unit 23.

(Converter Control Unit 22)

Figure 2:
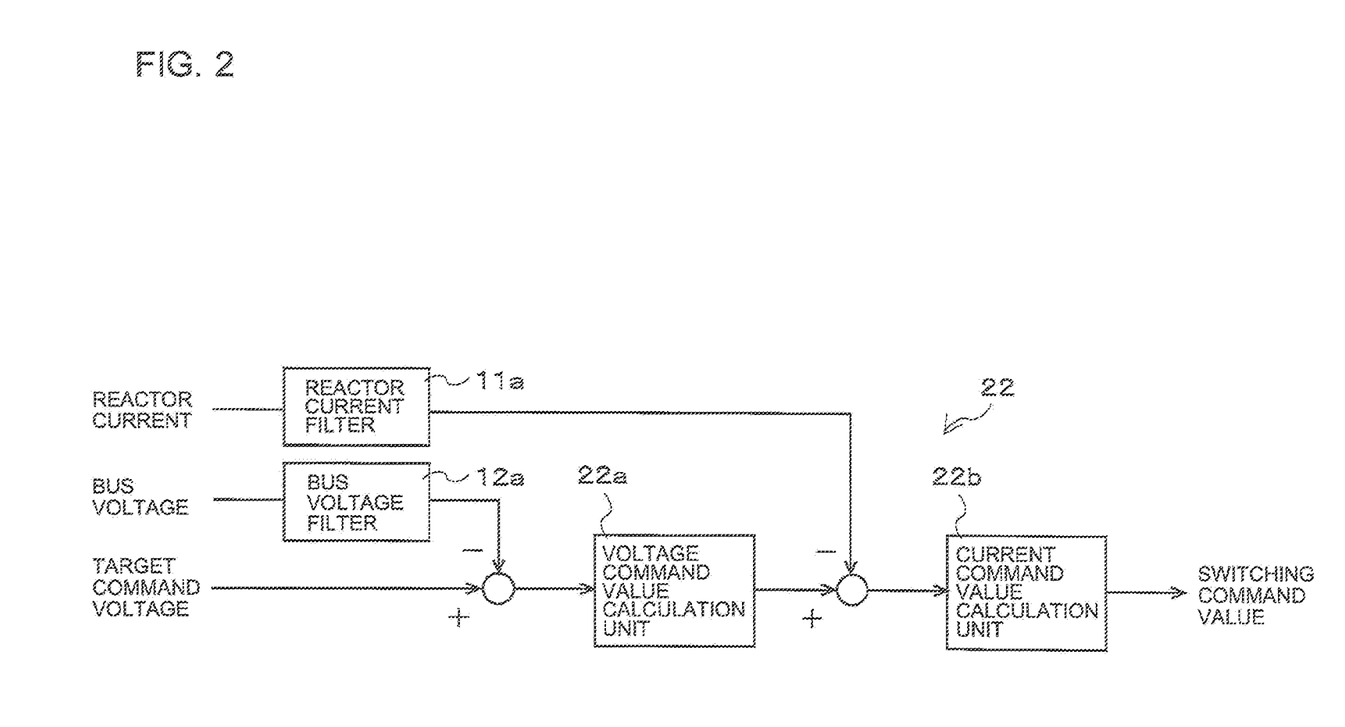
FIG. 2 is a block diagram showing a converter control unit 22 in Embodiment 1.

As described above, the converter control unit 22 controls switching operation of the switching element 4b of the converter unit 4. FIG. 2 is a block diagram showing the converter control unit 22 in Embodiment 1. As shown in FIG. 2, the converter control unit 22 includes a voltage command value calculation unit 22a and a current command value calculation unit 22b, and calculates a switching command value (ON duty command value) for driving the switching element 4b, on the basis of a target command voltage which is a bus voltage to be targeted, the bus voltage detected by the bus voltage detection unit 12, and the reactor current detected by the reactor current detection unit 11.

Specifically, first, the voltage command value calculation unit 22a calculates a voltage command value on the basis of the target command voltage and a bus voltage whose noise is removed by a bus voltage filter 12a. The voltage command value calculation unit 22a is able to use proportional control, integral control, or the like. Next, the current command value calculation unit 22b calculates a switching command value on the basis of the voltage command value and a reactor current whose noise is removed by a reactor current filter 11a. The current command value calculation unit 22b is able to use proportional control, integral control, differential control, or the like.

Figure 3:
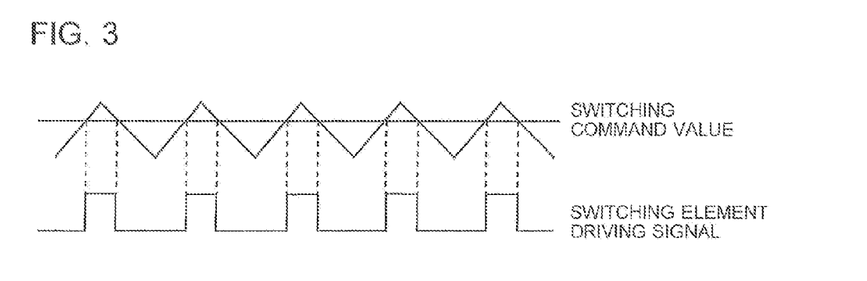
FIG. 3 is a graph showing a switching command value in Embodiment 1.

FIG. 3 is a graph showing a switching command value in Embodiment 1, The converter control unit 22 drives the switching element 4b with the switching command value obtained by the current command value calculation unit 22b. Specifically, by applying the calculated switching command value to a triangular wave having predetermined frequency, a period during which the triangular wave is greater than the switching command value is an ON state of a switching element driving signal, and a period during which the triangular wave is smaller than the switching command value is an OFF state of the switching element driving signal. When the switching command value changes, the times of ON and OFF of the switching element driving signal change, so that the ON duty ratio changes. The converter control unit 22 drives the switching element 4b with the switching element driving signal obtained on the basis of the switching command value.

In general, when the DC voltage is boosted by the converter unit 4, where the DC voltage that is rectified by the rectifier 3 and has not been boosted is denoted by Ed and the target command voltage is denoted by Eo, a switching command value is obtained from the following formula (1).

[Math. 1]

$$D=(Eo-Ed)/Eo \qquad (1)$$

In addition, where the voltage of the AC power supply 2 is denoted by Vs, a maximum value Edmax of the DC voltage Ed rectified by the rectifier 3 is as shown in the following formula (2).

[Math. 2]

$$Edmax=2^{1/2} \cdot Vs \qquad (2)$$

Moreover, a minimum value Edmin of the DC voltage Ed is as shown in the following formula (3).

[Math. 3]

$$Edmin=(6^{1/2} \cdot Vs)/2 \qquad (3)$$

That is, when the voltage of the AC power supply 2 and the target command voltage are determined, the maximum value and the minimum value of the switching command value are determined, and half of the sum of the maximum value and the minimum value is an average. The switching command value pulsates in a cycle which is six times of the frequency of the AC power supply 2. Thus, the switching command value may be filtered by using a sufficiently large filter to be averaged, thereby suppressing pulsation of the switching command value in a cycle which is six times of the frequency of the AC power supply 2.

(Temperature Correction Unit 25)

The temperature correction unit 25 corrects the temperature of the switching element 4b detected by the temperature detection unit 13, on the basis of the switching command value calculated by the converter control unit 22. The switching command value corresponds to an amount of work done by the converter unit 4. The larger the amount of work done by the converter unit 4 is, the higher the temperature of the switching element 4b is. The temperature correction unit 25 receives the signal regarding the temperature of the switching element 4b from the temperature detection circuit 13a which receives the signal outputted from the temperature detection unit 13.

Figure 4:
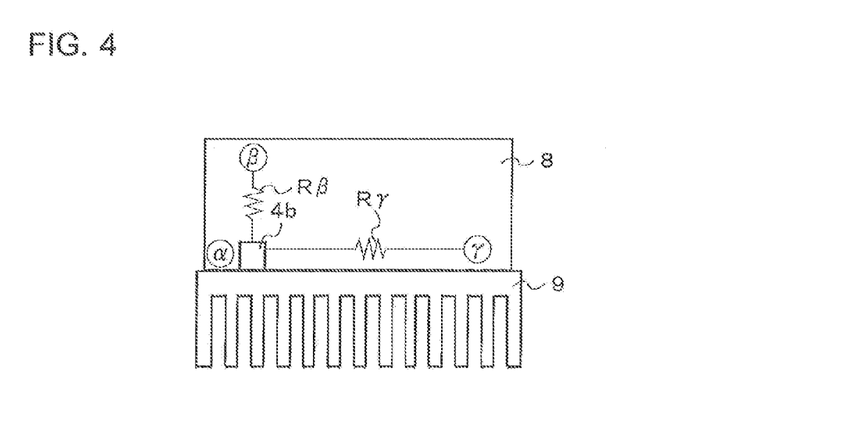
FIG. 4 is a schematic diagram showing installation positions of a temperature detection unit 13 in Embodiment 1.

Here, the relationship between the temperature of the switching element 4b detected by the temperature detection unit 13 and the installation position of the temperature detection unit 13 will be described. FIG. 4 is a schematic diagram showing installation positions of the temperature detection unit 13 in Embodiment 1, As shown in FIG. 4, the module 8 is bonded, for example, to a heat sink 9. In the module 8, the switching element 4b of the converter unit 4 is one of components which generate heat most. Thus, the switching element 4b is in direct contact with the heat sink 9.

FIG. 4 shows an example in which the temperature detection unit 13 is installed at a position α, a position β, or a position γ. The distance between the switching element 4b and the temperature detection unit 13 has a relationship of position α<position β<position γ.

Here, where a thermal resistivity is denoted by ρ, a distance for which heat is transmitted is denoted by L, and an area in which heat is transmitted is denoted by S, a thermal resistance R is obtained from the following formula (4).

[Math. 4]

$$R = \rho \times L/S \quad (4)$$

Furthermore, where a heat flow is denoted by Q, a temperature difference ΔT between objects between which heat is transmitted is obtained from the following formula (5).

[Math. 5]

$$\Delta T = R \times Q = (\rho \times L/S) \times Q \quad (5)$$

As seen from the formula (5), the larger the distance L for which heat is transmitted in the same material (the thermal resistivity ρ), the greater the temperature difference ΔT between objects is. That is, the larger the distance between the switching element 4b and the temperature detection unit 13 is, the greater the temperature difference ΔT therebetween is.

Figure 5:
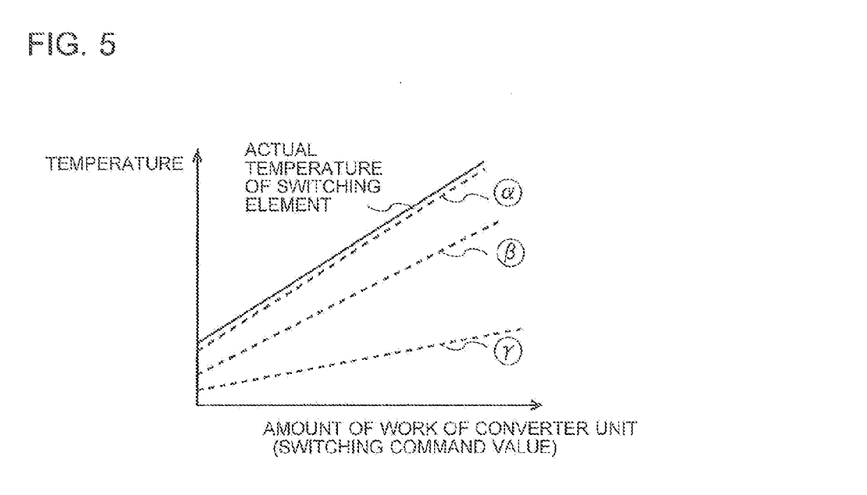
FIG. 5 is a graph showing a relationship between a switching command value and temperature in Embodiment 1.

FIG. 5 is a graph showing the relationship between the switching command value and temperature in Embodiment 1. In FIG. 5, the horizontal axis indicates an amount of work of the converter unit 4 (the switching command value), and the vertical axis indicates temperature. As shown in FIG. 5, the larger the amount of work done by the converter unit 4 (the switching command value) is, the higher the temperature of the switching element 4b is, as described above.

As the distance between the temperature detection unit 13 and the switching element 4b decreases such as at the position α, the temperature of the switching element 4b detected by the temperature detection unit 13 indicates a value substantially equal to the actual temperature (a solid line) of the switching element 4b. That is, when the temperature detection unit 13 is disposed at the position α, it is possible to accurately measure the temperature of the switching element 4b. On the other hand, as the distance between the temperature detection unit 13 and the switching element 4b increases such as at the position β or the position γ, the temperature of the switching element 4b detected by the temperature detection unit 13 indicates a value lower than the actual temperature of the switching element 4b.

When the temperature detection unit 13 is disposed at the position β or the position γ as described above, a thermal resistance Rβ or thermal resistance Rγ larger than a thermal resistance Rα at the position α is present between the switching element 4b and the temperature detection unit 13 (Rα<Rβ<Rγ). Thus, only a portion of the heat generated by the switching element 4b is transmitted to the temperature detection unit 13. Therefore, a difference is created between the temperature detected by the temperature detection unit 13 and the actual temperature of the switching element 4b.

In general, the converter unit 4 operates after the inverter unit 6 starts operating. That is, even when the converter unit 4 stops, the inverter unit 6 is operating, and thus the temperature within the module 8 is high. As shown in FIG. 5, even when the converter unit 4 stops, the intercept of each line at which the amount of work of the converter unit 4 is zero does not pass through the lowermost portion of the graph.

Figure 6:
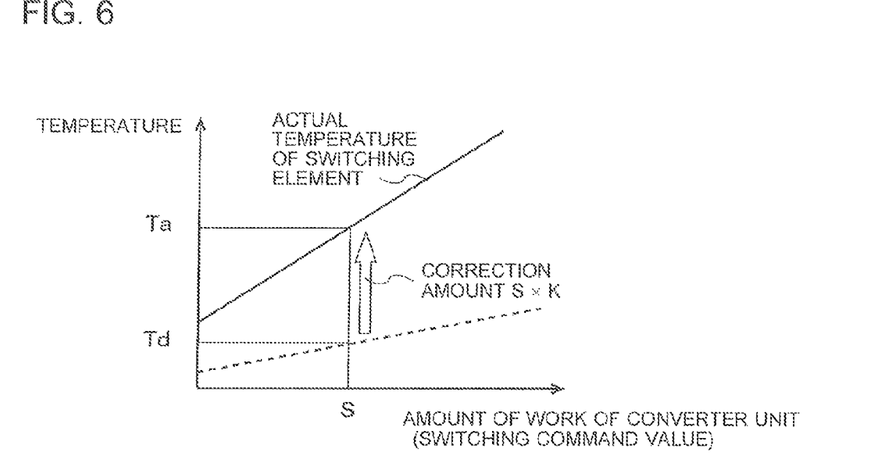
FIG. 6 is a graph showing a correction amount of a temperature corrected by a temperature correction unit 25 in Embodiment 1.

Next, a correction amount of the temperature corrected by the temperature correction unit 25 will be described. FIG. 6 is a graph showing the correction amount of the temperature corrected by the temperature correction unit 25 in Embodiment 1. As shown in FIG. 6, where the temperature of the switching element 4b detected by the temperature detection unit 13 is denoted by Td, the switching command value is denoted by S, and a proportionality coefficient is denoted by K, an actual temperature Ta of the switching element 4b is obtained from the following formula (6).

[Math. 6]

$$Ta = Td + S \times K \quad (6)$$

In the formula (6), K is determined from the thermal resistance R and the like, and the thermal resistivity ρ required to calculate the thermal resistance R is determined at a time point at which the configuration of the module 8 is determined. The configuration of the module 8 is complicated, and thus it may be not possible to analyze and calculate the thermal resistance R. In this case, the actual temperature of the switching element 4b and the temperature detected by the temperature detection unit 13 may be measured by using an actual device, and the temperature may be corrected by using these measured values.

(Storage Unit 24)

The storage unit 24 stores the relationship between the switching command value and the correction amount of the temperature corrected by the temperature correction unit 25. Specifically, first, a function of temperature and the amount of work of the converter unit 4 (the switching command value) as shown in FIG. 5 is obtained beforehand. Then, the correction amount, that is, the difference between the actual temperature of the switching element 4b and the temperature detected by the temperature detection unit 13, is tabularized or made into a function for each switching command value, and the storage unit 24 stores the table or the function therein.

That is, the storage unit 24 stores a correction table or correction function showing the relationship between the switching command value and the correction amount of the temperature corrected by the temperature correction unit 25. Among them, the correction table corresponds to S×K in the above formula (6), and the correction function is the above formula (6) itself. Then, the temperature correction unit 25 corrects the temperature of the switching element 4b detected by the temperature detection unit 13, on the basis of the switching command value and the correction table or the correction function stored in the storage unit 24. In this case, a switching command value calculated during actual operation is used as the switching command value.

(Threshold Determination Unit 26)

The threshold determination unit 26 determines whether the temperature corrected by the temperature correction unit 25 exceeds a preset first threshold, and determines whether the temperature corrected by the temperature correction unit 25 exceeds a preset second threshold. Among these thresholds, the first threshold is set to a temperature at which, when the output of the power conversion device 1 is decreased, the power conversion device 1 or the air-conditioning apparatus including the power conversion device 1 does not need to be stopped.

In addition, the second threshold is set to a temperature at which, even when the output of the power conversion device 1 is decreased, the power conversion device 1 or the air-conditioning apparatus including the power conversion device 1 breaks down due to superheat of the module 8. The second threshold is higher than the first threshold. Thus, the second threshold causes a higher risk that the module 8 breaks down, than the first threshold. When the second threshold is set to a value including a margin relative to a temperature that leads directly to breakdown of the module 8, it is possible to appropriately suppress breakdown of the module 8. The second threshold is set, for example, to a temperature lower than the heat resistance temperature of the switching element 4b.

(Fault Suppression Control Unit 27)

The fault suppression control unit 27 instructs each component to perform an operation for suppressing breakdown, on the basis of the temperature corrected by the temperature correction unit 25. Specifically, if the threshold determination unit 26 determines that the temperature corrected by the temperature correction unit 25 exceeds the first threshold, the fault suppression control unit 27 instructs the converter control unit 22 to decrease the output (i.e., a boosting amount) of the converter unit 4. Or, if the threshold determination unit 26 determines that the temperature corrected by the temperature correction unit 25 exceeds the first threshold, the fault suppression control unit 27 instructs the inverter control unit 23 to decrease the output (i.e., the frequency) of the inverter unit 6. Furthermore, if the threshold determination unit 26 determines that the temperature corrected by the temperature correction unit 25 exceeds the second threshold, the fault suppression control unit 27 instructs the converter unit 4, the inverter unit 6, and the like to stop due to abnormality.

(Inverter Control Unit 23)

As described above, the inverter control unit 23 controls switching operation of an inverter switching element 6a of the inverter unit 6. In addition, upon receiving, from the fault suppression control unit 27, a signal to instruct decreasing of output of the inverter unit 6 or abnormal stop of the inverter unit 6, the inverter control unit 23 controls the inverter unit 6 according to the instruction.

Next, operation of the power conversion device 1 according to Embodiment 1 will be described. First, the input voltage supplied from the AC power supply 2 is converted to a DC voltage by the rectifier 3. Next, the DC voltage rectified by the rectifier 3 is boosted by the converter unit 4. Then, the bus voltage boosted by the converter unit 4 is smoothed by the smoothing capacitor 5, and is subsequently converted to an AC voltage by the inverter unit 6. By using the AC voltage resulting from the conversion by the inverter unit 6, the load such as the motor 7 is operated.

Next, operation of the control unit 21 which controls the power conversion device 1 will be described. The converter control unit 22 of the control unit 21 calculates a switching command value during operation of the power conversion device 1 on the basis of the target command voltage, the bus voltage detected by the bus voltage detection unit 12, and the reactor current detected by the reactor current detection unit 11. Then, the converter control unit 22 outputs the calculated switching command value to the temperature correction unit 25.

Meanwhile, the temperature correction unit 25 receives the signal regarding the temperature of the switching element 4b from the temperature detection circuit 13a which receives the signal outputted from the temperature detection unit 13, and reads the correction table or the correction function stored in the storage unit 24. Then, the temperature correction unit 25 sets a correction amount for temperature on the basis of the switching command value received from the converter control unit 22, the temperature of the switching element 4b detected by the temperature detection unit 13, and the correction table or the correction function. The temperature correction unit 25 corrects the temperature of the switching element 4b detected by the temperature detection unit 13, by adding the correction amount for temperature to the temperature of the switching element 4b detected by the temperature detection unit 13.

Then, the threshold determination unit 26 determines whether the temperature of the switching element 4b corrected by the temperature correction unit 25 exceeds the first threshold. The first threshold is set to a temperature at which, when the output of the power conversion device 1 is decreased, the power conversion device 1 or the air-conditioning apparatus including the power conversion device 1 does not need to be stopped. If the threshold determination unit 26 determines that the temperature of the switching element 4b is equal to or lower than the first threshold, operation of the power conversion device 1 is continued. On the other hand, if the threshold determination unit 26 determines that the temperature of the switching element 4b exceeds the first threshold, the fault suppression control unit 27 instructs the converter control unit 22 to decrease the output of the converter unit 4, that is, a boosting amount thereof, or instructs the inverter control unit 23 to decrease the output of the inverter unit 6, that is, the frequency thereof.

Then, the threshold determination unit 26 further determines whether the temperature of the switching element 4b corrected by the temperature correction unit 25 exceeds the second threshold. The second threshold is set to a temperature at which, even when the output of the power conversion device 1 is decreased, the power conversion device 1 or the air-conditioning apparatus including the power conversion device 1 breaks down due to superheat of the module 8. At that time, even when these processes are performed, if the temperature of the switching element 4b does not decrease and further increases and the threshold determination unit 26 determines that the temperature of the switching element 4b exceeds the second threshold, the fault suppression control unit 27 instructs the converter control unit 22, the inverter control unit 23, and the like to stop the converter unit 4, the inverter unit 6, and the like due to abnormality.

As described above, in the power conversion device 1 according to Embodiment 1, the temperature correction unit 25 corrects the temperature of the switching element 4b detected by the temperature detection unit 13, on the basis of the switching command value. Thus, the corrected temperature of the switching element 4b is very close to the actual temperature of the switching element 4b. For example, when the temperature detection unit 13 is disposed at the position α shown in FIG. 5, the temperature of the switching element 4b detected by the temperature detection unit 13 is close to the actual temperature of the switching element 4b. However, in this case, since the temperature detection unit 13 needs to be disposed close to the switching element 4b, there is a possibility that it is difficult to design the module 8. In addition, if the temperature detection unit 13 is disposed close to the switching element 4b, the temperature detection unit 13 to be likely to be subject to noise by switching or the like, and there is a possibility that noise occurs in the temperature detected by the temperature detection unit 13.

On the other hand, in the power conversion device 1 according to Embodiment 1, the temperature correction unit 25 corrects the temperature of the switching element 4b. Thus, for example, even if the temperature detection unit 13 is disposed at a position away from the switching element 4b such as at the position β or the position γ shown in FIG. 5, it is possible to recognize a value close to the actual temperature of the switching element 4b. Therefore, limitations on arrangement of the switching element 4b within the module 8 are alleviated, so that the flexibility in designing the module 8 increases. In addition, it is possible to dispose the temperature detection unit 13 at a position away from the switching element 4b which is a noise source. Therefore, it is possible to cause the temperature detected by the temperature detection unit 13 to be unlikely to be subject to noise.

Moreover, if a detection error between the actual temperature of the switching element 4b and the temperature of the switching element 4b detected by the temperature detection unit 13 is great, is not corrected, and remains, it is necessary to set the temperature threshold which is set for performing an operation for suppressing a fault, to be lower by the detection error, thereby further increasing safety. In this case, since the threshold is set to be lower by the detection error, the operating range of the power conversion device 1 narrows.

On the other hand, the power conversion device 1 according to Embodiment 1 corrects the detection error by using the switching command value which influences heat generation of the converter unit 4. Thus, it is not necessary to set the temperature threshold which is set for performing an operation for suppressing a fault, to be lower, and it is possible to set the threshold to an optimum threshold. Therefore, the reliability of protection against heat generated by the module 8 improves. In addition, when the power conversion device 1 is used in a motor driving system, it is possible to exert maximum performance of the motor driving system.

In addition, in the case where SiC is used as the switching element 4b, SiC itself is operable at a high temperature, but the allowable temperature of each component around SiC is lower than that of SiC. As a result, there is a possibility that performance of SiC cannot be sufficiently exerted. However, in the power conversion device 1 according to Embodiment 1, it is possible to dispose components such as the temperature detection unit 13, away from the switching element 4b. Thus, it is possible to exert maximum performance of SiC.

The case has been described above in which a correction amount for temperature is obtained and the temperature of the switching element 4b detected by the temperature detection unit 13 is made close to the actual temperature of the switching element 4b by using the correction amount. In addition to this, for example, after a correction amount for temperature is obtained, the first threshold or the second threshold may be changed by using the correction amount. In this case as well, similarly to the case where the temperature of the switching element 4b is corrected, the effect of being able to improve the reliability in suppressing a fault of the module 8 is exerted. In addition, the storage unit 24 stores the correction amount for temperature, but may store the corrected temperature.

The air-conditioning apparatus may be configured to include, in addition to the power conversion device 1 of the present invention, the motor 7 which is driven by the power conversion device 1. The motor 7 is driven by the power conversion device 1 which is able to appropriately recognize the temperature of the switching element 4b of the converter unit 4. Thus, the air-conditioning apparatus including the motor 7 has extremely high reliability in heat resistance.

REFERENCE SIGNS LIST 1 power conversion device 2 AC power supply 3 rectifier 4 converter unit 4a reactor 4b switching element 4c backflow prevention element 5 smoothing capacitor 6 inverter unit 6a inverter switching element 7 motor 8 module 9 heat sink 11 reactor current detection unit 11a reactor current filter 12 bus voltage detection unit 12a bus voltage filter 13 temperature detection unit 13a temperature detection circuit 14 motor current detection unit 21 control unit 22 converter control unit 22a voltage command value calculation unit 22b current command value calculation unit 23 inverter control unit 24 storage unit temperature correction unit 26 threshold determination unit 27 fault suppression control unit

The invention claimed is:

1. A power conversion device comprising:
a rectifier configured to rectify an input voltage supplied from an AC power supply;
a converter including a reactor connected to an output end of the rectifier, a backflow prevention element connected in series to the reactor, and a switching element connected between the reactor and the backflow prevention element, the converter being configured to boost a DC voltage rectified by the rectifier;
a smoothing capacitor configured to smooth a bus voltage outputted from the converter;
a reactor current detector configured to detect a reactor current flowing through the reactor;
a bus voltage detector configured to detect the bus voltage;
a temperature detector configured to detect a temperature of the switching element;
a converter control unit configured to calculate a switching command value for driving the switching element, on a basis of a target command voltage which is the bus voltage to be targeted, the bus voltage detected by the bus voltage detector, and the reactor current detected by the reactor current detector; and
a temperature correction unit configured to correct the temperature of the switching element detected by the temperature detector, on a basis of the switching command value calculated by the converter control unit.

2. The power conversion device of claim 1, further comprising:
a storage unit configured to store a correction table or a correction function showing a relationship between the switching command value and a correction amount of the temperature corrected by the temperature correction unit; and wherein
the temperature correction unit corrects the temperature of the switching element detected by the temperature detector, by using, as the switching command value, a switching command value calculated during accrual operation, on a basis of the switching command value and the correction table or the correction function stored in the storage unit.

3. The power conversion device of claim 2, wherein
the rectifier, the switching element, and the backflow prevention element are integrated in a module, and
the correction table or the correction function is set on a basis of a distance between the temperature detector and the switching element within the module.

4. The power conversion device of claim 1, wherein the converter control unit averages the switching command value which pulsates in a cycle which is six times that of the AC power supply.

5. The power conversion device of claim 1, further comprising:
a fault suppression control unit configured to instruct each component to perform an operation for suppressing a fault, on a basis of the temperature corrected by the temperature correction unit.

6. The power conversion device of claim 5, further comprising:
a threshold determination unit configured to determine whether the temperature corrected by the temperature correction unit exceeds a preset first threshold, and determine whether the temperature corrected by the temperature correction unit exceeds a preset second threshold.

7. The power conversion device of claim 6, wherein when the threshold determination unit determines that the temperature corrected by the temperature correction unit exceeds the first threshold, the fault suppression control unit instructs the converter control unit to decrease output of the converter.

8. The power conversion device of claim 6, further comprising:
an inverter unit configured to convert the bus voltage smoothed by the smoothing capacitor, to an AC voltage; and
an inverter control unit configured to control operation of the inverter unit, wherein
when the threshold determination unit determines that the temperature corrected by the temperature correction unit exceeds the first threshold, the fault suppression control unit instructs the inverter control unit to decrease output of the inverter unit.

9. The power conversion device of claim 6, wherein when the threshold determination unit determines that the temperature corrected by the temperature correction unit exceeds the second threshold, the fault suppression control unit instructs abnormal stop.

10. The power conversion device of claim 6, wherein the first threshold is lower than the second threshold.

11. The power conversion device of claim 6, wherein the second threshold is set to a temperature lower than a heat resistance temperature of the switching element.

12. The power conversion device of claim 1, wherein at least one of the switching element and the backflow prevention element is composed of a wide band gap semiconductor.

13. An air-conditioning apparatus comprising:
the power conversion device of claim 1; and
a motor driven by the power conversion device.

* * * * *